US011898401B2

(12) United States Patent
Goldberg

(10) Patent No.: US 11,898,401 B2

(45) **Date of Patent: *Feb. 13, 2024**

(54) BOTTOM RAIL ASSEMBLY FOR A COVERING WITH ADJUSTABLE ROLLER POSITION AND RELATED METHODS

(71) Applicant: Hunter Douglas Inc., Pearl River, NY (US)

(72) Inventor: Michael S. Goldberg, Stanley, NC (US)

(73) Assignee: Hunter Douglas Inc., Pearl River, NY (US)

( * ) Notice: Subject to any disclaimer, the term of this patent is extended or adjusted under 35 U.S.C. 154(b) by 478 days.

This patent is subject to a terminal disclaimer.

(21) Appl. No.: 17/139,112

(22) Filed: Dec. 31, 2020

(65) Prior Publication Data

US 2021/0123300 A1 Apr. 29, 2021

Related U.S. Application Data

(63) Continuation of application No. 15/985,762, filed on May 22, 2018, now Pat. No. 10,895,106.

(Continued)

(51) Int. Cl.

| | |
|---|---|
| ***E06B 9/40*** | (2006.01) |
| ***E06B 9/44*** | (2006.01) |
| *E06B 9/24* | (2006.01) |

(52) U.S. Cl.

CPC ........ *E06B 9/44* (2013.01); *E06B 2009/2405* (2013.01); *E06B 2009/2447* (2013.01); *E06B 2009/2458* (2013.01); *E06B 2009/405* (2013.01)

(58) Field of Classification Search

CPC ........ E06B 2009/405; E06B 9/45; E06B 9/44; E06B 2009/2405; E06B 2009/2458;

(Continued)

(56) References Cited

U.S. PATENT DOCUMENTS

| | | | |
|---|---|---|---|
| 131,328 | A | 9/1872 | Binder |
| 738,720 | A | 9/1903 | Gerth |

(Continued)

FOREIGN PATENT DOCUMENTS

| | | |
|---|---|---|
| CN | 205314886 U | 6/2016 |
| CN | 205477312 U | 8/2016 |

(Continued)

OTHER PUBLICATIONS

A Taiwanese Office Action and Search Report dated Jul. 12, 2021.

(Continued)

*Primary Examiner* — Daniel P Cahn

*Assistant Examiner* — Jeremy C Ramsey

(74) *Attorney, Agent, or Firm* — Dority & Manning, P.A.

(57) ABSTRACT

In one aspect, a covering for an architectural structure may include a shade panel and a bottom rail assembly coupled to the shade panel. The bottom rail assembly may include a rail housing and a roller extending within the rail housing, with the shade panel being looped around the roller such that the bottom rail assembly is vertically supported by the shade panel as the panel is moved between extended and retracted positions. In addition, the relative positioning of the roller within the rail housing may be adjusted, as desired, between the top and bottom ends of the bottom rail housing.

18 Claims, 11 Drawing Sheets

Related U.S. Application Data

(60) Provisional application No. 62/509,846, filed on May 23, 2017.

(58) Field of Classification Search
CPC ..... E06B 2009/2447; E06B 2009/2423; E06B 2009/402; E06B 9/40; E06B 9/42
See application file for complete search history.

(56) References Cited

U.S. PATENT DOCUMENTS

| | | | | |
|---|---|---|---|---|
| 1,368,174 | A | 2/1921 | Lokometzki | |
| 1,451,947 | A | 4/1923 | Gugliuzzi | |
| 1,595,234 | A | 10/1926 | Kuyper | |
| 1,805,995 | A | 5/1931 | Palladino | |
| 2,191,008 | A | 2/1940 | Cheves | |
| 2,480,438 | A | 8/1949 | Bergman et al. | |
| 2,651,489 | A | 9/1953 | Bell | |
| 3,980,122 | A * | 9/1976 | Takazawa | E06B 9/64 160/85 |
| 6,196,508 | B1 | 3/2001 | Nijs | |
| 6,814,127 | B2 | 11/2004 | Tagtow et al. | |
| 7,134,473 | B2 | 11/2006 | Lukos | |
| 7,267,156 | B2 * | 9/2007 | Byeon | E06B 9/40 160/121.1 |
| 7,267,311 | B2 | 9/2007 | Jung | |
| 7,451,956 | B2 | 11/2008 | Bohlen | |
| 7,740,047 | B2 | 6/2010 | Koop et al. | |
| 7,770,625 | B2 | 8/2010 | Lukos | |
| 7,849,907 | B2 * | 12/2010 | Jang | E06B 9/40 160/89 |
| 7,854,419 | B2 | 12/2010 | Ng et al. | |
| 8,020,602 | B2 | 9/2011 | Smith et al. | |
| 8,122,932 | B2 | 2/2012 | Cannaverde | |
| 8,151,859 | B2 | 4/2012 | Koop et al. | |
| 8,220,520 | B2 | 7/2012 | Lukos | |
| 8,579,004 | B2 | 11/2013 | Cannaverde | |
| 8,960,621 | B2 | 2/2015 | Wills | |
| 9,249,620 | B2 | 2/2016 | Kim | |
| 9,587,429 | B2 * | 3/2017 | Cheng | E06B 9/42 |
| 9,631,422 | B1 * | 4/2017 | Chen | E06B 9/42 |
| 10,060,184 | B2 * | 8/2018 | Chu | E06B 9/42 |
| 10,443,304 | B2 | 10/2019 | Colson et al. | |
| 10,895,106 | B2 * | 1/2021 | Goldberg | E06B 9/44 |
| 2005/0183835 | A1 | 8/2005 | Nien | |
| 2008/0190569 | A1 | 8/2008 | Jang | |
| 2011/0139381 | A1 | 6/2011 | Daniels | |
| 2012/0043029 | A1 * | 2/2012 | Gaskill | E06B 9/42 160/121.1 |
| 2012/0152929 | A1 | 6/2012 | Hintennach | |
| 2015/0007949 | A1 | 1/2015 | Daniels | |
| 2016/0348428 | A1 * | 12/2016 | Cheng | E06B 9/40 |

FOREIGN PATENT DOCUMENTS

| | | | |
|---|---|---|---|
| CN | 106285434 | A | 1/2017 |
| DE | 3700745 | C2 | 6/1992 |
| EP | 2402544 | | 1/2012 |
| JP | 2009/079431 | | 4/2009 |
| KR | 2011/0033501 | | 3/2011 |
| KR | 1020160112238 | | 9/2016 |
| TW | 200714792 | | 4/2007 |
| TW | M510125 | | 10/2015 |
| WO | WO 2009/139751 | | 11/2009 |

OTHER PUBLICATIONS

Great Brittan Search Report for Application No. GB1808370.9 dated Nov. 30, 2018 (3 pages).
Netherlands Search Report and Written Opinion of the International Searching Authority for Application No. 2020963, dated Jan. 23, 2019 (7 pages).
Chinese Search Report for Application No. 201810498811.7 dated May 23, 2018 (3 pages).

* cited by examiner

FIG. –5–

BOTTOM RAIL ASSEMBLY FOR A COVERING WITH ADJUSTABLE ROLLER POSITION AND RELATED METHODS

CROSS-REFERENCE TO RELATED APPLICATIONS

The present application is a continuation of U.S. patent application Ser. No. 15/985,762, filed May 22, 2018, which, in turn, is based upon and claims the right of priority to U.S. Provisional Patent Application No. 62/509,846, filed May 23, 2017, the disclosures of both of which are hereby incorporated by reference herein in their entirety for all purposes.

FIELD OF THE INVENTION

The present subject matter relates generally to a bottom rail assembly suitable for use with a covering for an architectural structure and, more particularly, to a bottom rail assembly providing adjustable roller positions for a bottom or idling roller of a zebra-type or banded roller shade to allow the vertical alignment of shade bands of the roller shade to be adjusted.

BACKGROUND OF THE INVENTION

Various different types of coverings exist for placement relative to architectural structures, such as windows, doors, archways and the like. For instance, zebra-type or banded roller shades are known that include a roller sheet formed from alternating bands of differing materials, such as by alternating a transparent or sheer material and a light-blocking material along the length of the roller sheet. With such roller shades, the roller sheet typically extends between a first end coupled to a drive roller housed within the headrail and a second end coupled to either a portion of the headrail or a secondary roller housed within the headrail. In addition, the roller sheet is looped around an idling roller between its first and second ends such that the idling roller is suspended relative to the headrail via the roller shade. As such, by rotating the drive roller in a first direction, the roller sheet and, thus, the idling roller, may be lowered relative to the headrail to allow the roller sheet to at least partially cover the adjacent architectural structure. Similarly, by rotating the drive roller in the opposite direction, the roller sheet and, thus, the idling roller, may be raised relative to the headrail to allow the roller sheet to at least partially expose the adjacent architectural structure.

When installing a banded roller shade relative to an architectural structure, it is often desirable to ensure that the alternating shade bands are aligned relative to one another when the roller shade is lowered to its fully extended position. For instance, when the roller shade includes alternating bands of sheer and light blocking materials, it may be desirable for each light blocking band located in the rear of the shade to be aligned with a corresponding sheer band located in the front of the shade and vice versa to allow the shade to provide its full light-blocking capability at the fully extended position. However, in many instances, such alignment of the shade bands does not occur where the bottom end of the shade reaches the bottom of the adjacent architectural structure, such as the bottom of an associated window frame. As such, to achieve the desired alignment of the shade bands, the shade is typically raised relative to the adjacent architectural structure, thereby creating a gap between the bottom of the architectural structure and the bottom end of the shade. This gap can allow light to shine between the shade and the architectural structure and is often considered to be aesthetically displeasing to consumers. As an alternative to raising the shade relative to the adjacent architectural structure, a user may instead attempt to further extend the roller sheet to achieve the desired alignment of the shade bands. However, such extension of the roller sheet after the bottom end of the shade reaches the bottom of the adjacent architectural structure results in the roller sheet becoming slack, bunched, or folded.

Accordingly, an arrangement for use with a covering, such as a zebra-type or banded roller shade, that addresses the issues identified above in the prior art would be welcomed in the technology.

BRIEF DESCRIPTION OF THE INVENTION

Aspects and advantages of the present subject matter will be set forth in part in the following description, or may be obvious from the description, or may be learned through practice of the present subject matter.

In various aspects, the present subject matter is directed to a covering for an architectural structure. In several embodiments, the covering includes a shade panel and a bottom rail assembly coupled to the shade panel. The bottom rail assembly includes a rail housing and a roller extending within the rail housing, with the shade panel being looped around the roller such that the bottom rail assembly is vertically supported by the shade panel as the panel is moved between extended and retracted positions. In addition, the relative positioning of the roller within the rail housing may be adjusted, as desired, between the top and bottom ends of the bottom rail housing.

These and other features, aspects and advantages of the present subject matter will become better understood with reference to the following Detailed Description and appended claims. The accompanying drawings, which are incorporated in and constitute a part of this specification, illustrate embodiments of the present subject matter and, together with the description, serve to explain the principles of the present subject matter.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE INVENTION

Figure 1:
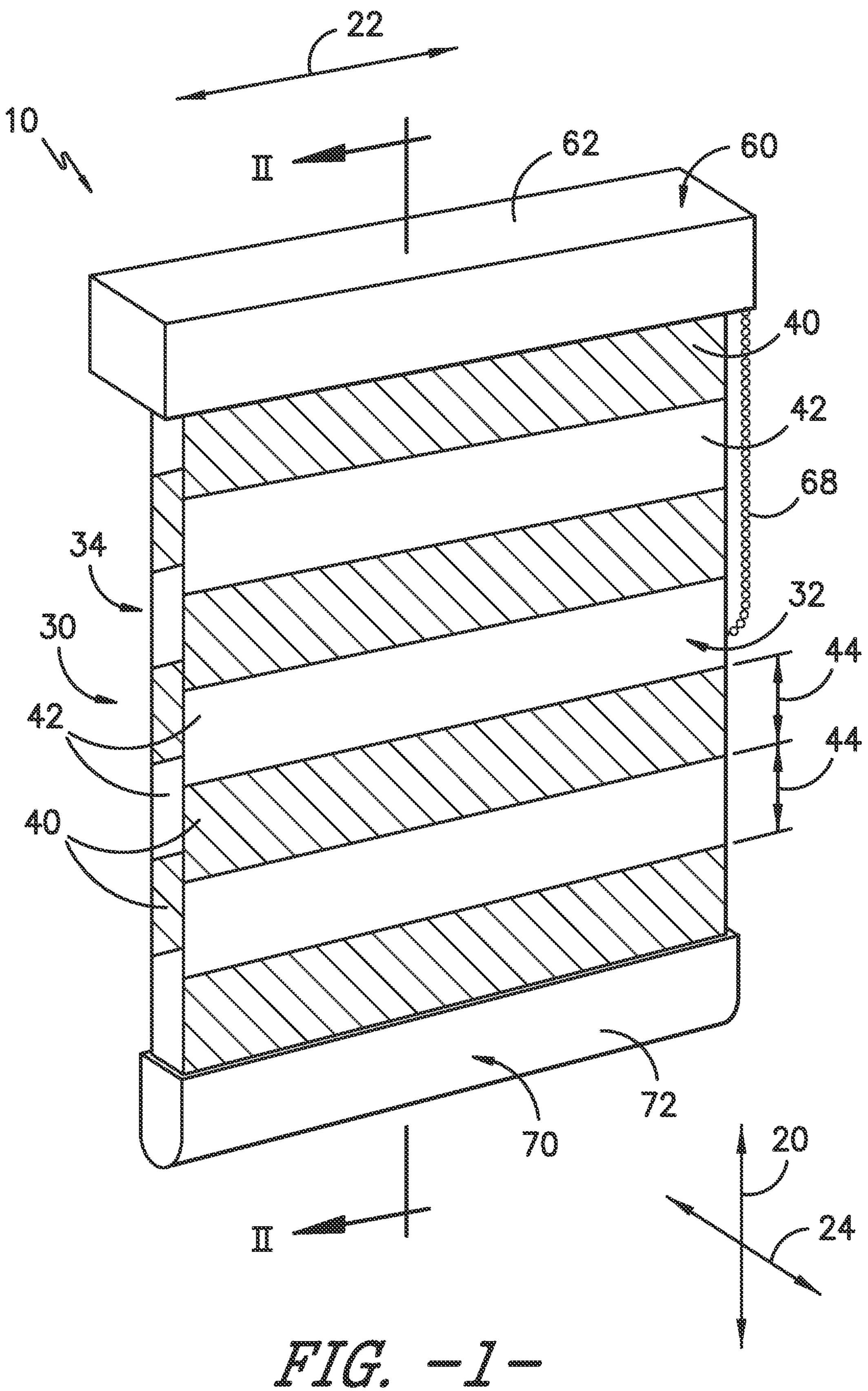
FIG. 1 illustrates a perspective view of one embodiment of a covering in accordance with aspects of the present subject matter.

In general, the present subject matter is directed to a covering for an architectural feature or structure (referred to herein simply as an architectural "structure" for the sake of convenience and without intent to limit). Specifically, in several embodiments, the covering includes a shade panel and a bottom rail assembly coupled to the shade panel. The bottom rail assembly includes a rail housing and a roller extending within the rail housing, with the shade panel being looped around the roller such that the bottom rail assembly is vertically supported by the shade panel as the panel is moved between extended and retracted positions. Additionally, in accordance with aspects of the present subject matter, the relative positioning of the roller within the rail housing may be adjusted, as desired, between the top and bottom ends of the housing.

In one embodiment, the covering is configured as a zebra-type or banded roller shade, with the shade panel including alternating bands of material spaced apart along its length. In such an embodiment, the relative positioning of the roller within the rail housing may be adjusted, as desired, to adjust the vertical alignment of the shade bands between opposed sides of the shade panel. For instance, in the event that the shade bands are vertically offset by a given distance when the roller shade is moved to the fully extended position, the vertical positioning of the roller within the rail housing may be adjusted up or down, as necessary, to achieve the desired vertical alignment of the shade bands.

In one embodiment, the adjustment of the positioning of the roller within the rail housing may be performed when the covering is being initially installed relative to an associated architectural structure (e.g., a window). For instance, the installer may lower the roller shade to the fully extended position so that the bottom rail assembly reaches the desired lowermost position, such as when the bottom rail assembly contacts the bottom of the adjacent architectural structure (e.g., the window sill defined at the bottom of the window frame). The installer may then visually check the alignment of the shade bands between each side of the shade panel. If the shade bands are vertically offset from the desired alignment at such fully extended position, the installer may then adjust the relative positioning of the roller until the shade bands are properly aligned. Thereafter, in one implementation, the installer may lock or otherwise fix the position of the roller relative to the rail housing to set the desired alignment of the shade bands at the fully extended position for the shade panel. Alternatively, the installer may simply leave the roller positioned at the desired location to allow for the desired alignment of the shade bands.

In one embodiment, the bottom rail assembly includes a positioning mechanism or roller post member provided in operative association with or coupled to the roller. In such an embodiment, the roller post member is configured to move relative to the rail housing with the roller to allow the position of the roller to be adjusted within the rail housing. For instance, the roller post member is coupled to an end of the roller and is configured to slide or move vertically between the top and bottom ends of the rail housing as the roller position is being adjusted. Additionally, in one embodiment, the roller post member is configured to rotationally support the roller within the rail housing.

In one embodiment, the roller post member is configured to be slidably received within a vertically oriented guide channel defined within the rail housing. For instance, an endcap of the rail housing includes guides (e.g., "hooked" flanges) extending therefrom towards the opposed endcap of the rail housing that are spaced apart from each other such that a guide channel is defined between the opposed guides. In such an embodiment, a portion of the roller post member is received within the guide channel to allow the roller post member to move vertically within the rail housing between the opposed guides.

Additionally, in one embodiment, the bottom rail assembly includes one or more locking or holding mechanisms associated with the roller post member for maintaining the roller post member in place relative to the rail housing, thereby inhibiting or preventing further relative motion of the roller within the rail housing. For instance, the holding mechanism(s), in one embodiment, corresponds to a fastener, such as a set screw or other threaded fastener, configured to lock or fix the roller post member relative to the rail housing. In such an embodiment, by loosening the fastener relative to the rail housing, the roller post member is allowed to freely move or slide between the top and bottom ends of the rail housing. Similarly, by tightening the fastener relative to the rail housing, the roller post member is maintained in position relative to the rail housing, thereby fixing or setting the relative position of the roller within the housing.

Moreover, in several embodiments, the present subject matter is also directed to a method for adjusting the alignment of shade bands of an associated banded roller shade when the roller shade is installed relative to an adjacent architectural structure. In one embodiment, the method includes lowering a shade panel of the roller shade to an extended position relative to the adjacent architectural structure. In addition, the method includes adjusting a position of a roller of a bottom rail assembly of the roller shade between top and bottom ends of an associated rail housing of the bottom rail assembly to adjust a vertical alignment of the shade bands between first and second sides of the shade panel. The method also includes maintaining the position of the roller relative to the rail housing to set the vertical alignment of the shade bands between the first and second sides of the roller shade when the roller shade is at the extended position.

In another aspect, the present subject matter is directed to a zebra-type or banded roller shade for an architectural structure. Specifically, in several embodiments, the roller shade includes a shade panel having alternating bands of material spaced apart along its length, and a bottom rail housing coupled to the shade panel. The shade panel includes a looped bottom portion positioned within the bottom rail housing such that the shade panel includes both a first shade segment extending upwardly from the bottom rail housing that forms a first side of the shade panel and a second shade segment extending upwardly from the bottom rail housing that forms a second side of the shade panel. Additionally, in accordance with aspects of the present subject matter, the relative positioning of the bottom looped portion of the shade panel within the rail housing may be adjusted, as desired, between the top and bottom ends of the housing to adjust a vertical alignment of the alternating shade bands between the first and second sides of the shade panel. Specifically, in one embodiment, the bottom looped portion is adjustably mounted within the bottom rail housing to adjust a vertical alignment of the alternating shade bands between the first and second sides of the shade panel.

For instance, in one embodiment, to raise the bottom looped portion of the shade panel relative to the rail housing, the lengths of the first and second shade segments (e.g., as defined between a head rail assembly of the shade and the looped bottom portion of the shade panel) are decreased. Similarly, in one embodiment, to lower the bottom looped portion of the shade panel relative to the rail housing, the lengths of the first and second shade segments are increased.

Further, the present subject matter is also directed to a method for adjusting the alignment of shade bands of an associated banded roller shade when the roller shade is installed relative to an adjacent architectural structure. In several embodiments, the method includes lowering a shade panel of a roller shade to an extended position relative to an adjacent architectural structure. In addition, the method includes adjusting a position of a bottom looped portion of the shade panel between top and bottom ends of an associated bottom rail housing to adjust a vertical alignment of the shade bands between first and second sides of the shade panel. The method also includes maintaining the position of the bottom looped portion of the shade panel relative to the bottom rail housing to set the vertical alignment of the shade bands between the first and second sides of the roller shade when the roller shade is at the extended position.

Figure 2:
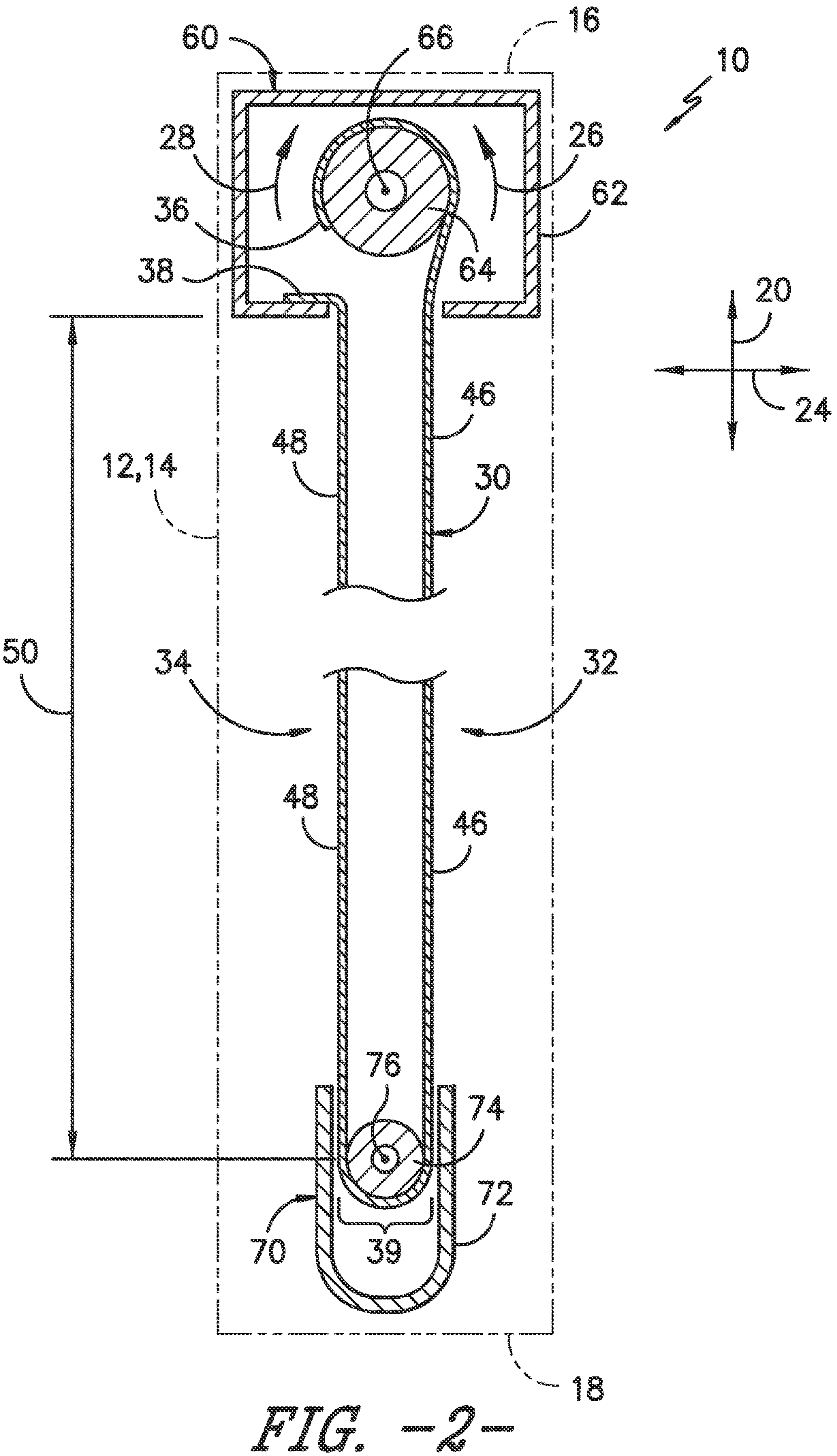
FIG. 2 illustrates a cross-sectional view of the covering embodiment shown in FIG. 1 taken about line II-II.

Referring now to the drawings, FIGS. 1 and 2 illustrate differing views of one illustrative embodiment of a covering 10 for an architectural structure (as indicated by phantom lines 12 in FIG. 2) in accordance with aspects of the present subject matter, with FIG. 1 illustrating a perspective view of the covering 10 and FIG. 2 illustrating a cross-sectional view of the covering 10 shown in FIG. 1 taken about line I-I. In general, the covering 10 may be configured to be installed relative to a window, door, or any other suitable architectural structure 12 as may be desired. In one embodiment, the covering 10 may be configured to be mounted relative to an architectural structure 12 to allow the covering 10 to be suspended or supported relative to the architectural structure 12. It should be understood that the covering 10 is not limited in its particular use as a window or door shade, and may be used in any application as a covering, partition, shade, and/or the like, relative to and/or within any type of architectural structure. However, for purposes of description and without intent to limit the scope of the present subject matter, the covering 10 will generally be described herein with reference to being installed relative to a window. For instance, as shown in FIG. 2, an outline of a window frame 14 is shown in phantom lines, with the window frame 14 extending between a top frame end 16 and a bottom frame end 18. As is generally understood, the bottom frame end 18 of the window frame 14 may generally define a window sill of the window.

As shown in the illustrated embodiment, the covering 10 includes a shade panel 30 configured to be moved between an extended position (e.g., as shown in FIGS. 1 and 2) and a retracted position (not shown). When lowered from the retracted position to the extended position, the shade panel 30 may be configured to cover the adjacent architectural structure 12. Similarly, when raised from the extended position to the retracted position, the shade panel 30 may be configured to expose the adjacent architectural structure 12. It should be appreciated that the shade panel 30 may also be configured to be moved to any suitable intermediate position defined between the extended and retracted positions to allow the adjacent architectural structure 12 to be only partially covered or exposed.

When in the extended position, the shade panel 30 may generally extend in a vertical or heightwise direction of the covering 10 (e.g., as indicated by arrow 20 in FIGS. 1 and 2) between a headrail assembly 60 and an opposed bottom rail assembly 70. In addition, the shade panel 30 may generally be configured to extend in a cross-wise direction of the covering 10 (e.g., as indicated by arrow 22 in FIG. 1) across the width of the adjacent architectural structure 12 and in a depthwise direction of the covering 10 (e.g., as indicated by arrow 24 in FIGS. 1 and 2) between a first side 32 and a second side 34. As particularly shown in FIG. 2, the first side 32 of the shade panel 30 is spaced apart from the second side 34 of the shade panel 30 in the depthwise direction 24 due to the looped configuration of the panel 30, as will be described in greater detail below.

In several embodiments, the covering 10 may be configured as a zebra-type or banded roller shade and, thus, the shade panel 30 may correspond to a continuous roller sheet extending lengthwise between a first end 36 (FIG. 2) and a second end 38 (FIG. 2). In addition, the shade panel 30 may include alternating strips or bands of material spaced apart along the length of the panel 30 defined between its first and second ends 36, 38. For instance, as shown in FIG. 1, the shade panel 30 includes a plurality of first shade bands 40 and a plurality of second shade bands 42, with the first and second shade bands 40, 42 being provided in an alternating configuration along the length of the shade panel 30 such that each first shade band 40 is separated from an adjacent first shade band 40 by a second shade band 42. As such, the alternating shade bands 40, 42 may be spaced apart along the heightwise direction 20 of the covering 10 when the covering 10 is moved between the extended and retracted positions. It should be appreciated that, for purposes of illustration, the first shade bands 40 have been shown with some cross-hatching in FIG. 1 to allow the first and second shade bands 40, 42 to be easily distinguished from one another in the drawing.

In several embodiments, the first and second shade bands 40, 42 may be formed from different materials having differing light transmission properties. For instance, the first shade bands 40 may be formed from a first material having a first light transmittance value and the second shade bands 42 may be formed from a different, second material having a lower or higher light transmittance value. Specifically, in one embodiment, the first shade bands 40 may be formed from a more opaque or light-blocking material (e.g., a black-out material or any other light-filtering fabric) while the second shade bands 42 may be formed from a more transparent or semi-transparent material (e.g., a sheer material). However, in other embodiments, the first and second shade bands 40, 42 may be formed from any other suitable materials (including any other suitable dissimilar materials or the same materials) having any suitable light transmission properties.

It should be appreciated that, by forming the first and second shade bands 40, 42 from different materials having differing light transmission properties, the covering 10 may be selectively adjusted between an “open” configuration and a “closed” configuration when shade panel 30 is extended. For instance, when the first shade bands 40 are formed from a light-blocking material and the second shade bands 42 are formed from a transparent or sheer material, the covering 10 may be provided in an “open” configuration by aligning each second shade band 42 disposed on the first side 32 of the shade panel 30 with a corresponding second shade band 42 disposed on the second side 34 of the shade panel 30, thereby allowing light to be transmitted through the aligned second shade bands 42. Similarly, in such an embodiment, the covering 10 may be provided in an “closed” configuration by aligning each second shade band 42 disposed on the first side 32 of the shade panel 30 with a corresponding first shade band 40 disposed on the second side 34 of the shade panel 30, thereby allowing the light-blocking potential of the shade panel 30 to be maximized.

Additionally, in several embodiments, each shade band 40, 42 may define a height 44 (FIG. 1) in the heightwise direction 20 of the covering 10, which generally corresponds to the vertical spacing defined between adjacent shade bands 40, 42. In one embodiment, the height 44 of each first shade band 40 may be the same as the height 44 of each second shade band 42. However, in other embodiments, the first shade bands 40 may define differing heights 44 than the second shade bands 42. Moreover, it should be appreciated that the specific height 44 selected for each shade band 40, 42 may generally vary depending on the particular application within which the disclosed covering 10 is being used. However, in general, the height 44 may generally be greater than about 0.5 inch to about 2 inches (e.g., in 0.2 inch increments) and less than about 6 inches to about 8 inches (e.g., in 0.2 inch increments).

As indicated above, the covering 10 may also include a headrail assembly 60, with the shade panel 30 being configured to extend downwardly from the headrail assembly 60. As particularly shown in FIG. 2, the headrail assembly 60 includes an upper rail housing 62 and a drive roller 64 extending lengthwise within the rail housing 62 along the cross-wise direction 22 (FIG. 1) of the covering 10. The drive roller 64 may generally be rotationally supported within the upper rail housing 62 for rotation relative to the rail housing 62 about a drive axis of rotation 66 (FIG. 2).

Additionally, the covering 10 may include a bottom rail assembly 70. In embodiments in which the covering 10 includes both the headrail assembly 60 and the bottom rail assembly 70, the shade panel 30 may be configured to extend vertically between such assemblies 60, 70 when in the extended position. As shown in FIG. 2, the bottom rail assembly 70 includes a lower rail housing 72 and an idling roller 74 extending lengthwise within the rail housing 72 along the cross-wise direction 22 (FIG. 1) of the covering 10. The idling roller 74 may generally be rotationally supported within the lower rail housing 72 for rotation relative to the rail housing 72 about an idling axis of rotation 76 (FIG. 2). It should be appreciated that the lower rail housing 72 may be in the form of a bottom rail for aesthetic purposes.

Moreover, as particularly shown in FIG. 2, the first and second ends 36, 38 of the shade panel 30 are configured to be coupled to one or more components of the headrail assembly 60. For instance, as shown in the illustrated embodiment, the first end 36 of the shade panel 30 is coupled to the drive roller 64 around its outer perimeter, while the second end 38 of the shade panel 30 is coupled to a portion of the interior of the upper rail housing 62. However, in other embodiments, the second end 38 of the shade panel 30 may be coupled to another element, such as a secondary roller (not shown) positioned within the upper rail housing 62.

Additionally, as shown in FIG. 2, the shade panel 30 is looped around the idling roller 74 of the bottom rail assembly 70 such that the bottom rail assembly 70 is suspended relative to the headrail assembly 60 via the shade panel 30. For instance, as shown in the illustrated embodiment, the shade panel 30 includes a looped bottom portion 39 that is looped or wrapped around a bottom half of the idling roller 74. In such an embodiment, by rotating the drive roller 64 in a first or raising direction (e.g., as indicated by arrow 26 in FIG. 2), the shade panel 30 is wound around the drive roller 64, thereby raising the bottom rail assembly 70 relative to the headrail assembly 60 and moving the shade panel 30 towards its retracted position. Similarly, by rotating the drive roller 62 in an opposite second or lowering direction (e.g., as indicated by arrow 28 in FIG. 2), the shade panel 30 is unwound from the drive roller 64, thereby lowering the bottom rail assembly 70 relative to the headrail assembly 60 and moving the shade panel 30 towards its extended position.

It should be appreciated that the drive roller 62 may be associated with any suitable drive mechanism or system configured to rotationally drive the roller 62, thereby allowing the shade panel 30 to be moved between the extended and retracted positions. For instance, as shown in FIG. 1, a control cord 68 is operatively coupled to the drive roller 62 for rotationally driving the roller 62. Alternatively, any other suitable drive mechanism or system may be used to rotationally drive the roller 62, such as an electric motor, a spring motor, and/or the like.

As shown in FIG. 2, given its looped configuration, the shade panel 30 includes both a first panel segment 46 and a second panel segment 48 extending vertically between the headrail assembly 60 and the bottom rail assembly 70, with the first panel segment 46 forming the first side 32 of the shade panel 30 (e.g., the portion of the panel 30 extending between the looped bottom portion 39 of the shade panel 30 and the drive roller 64) and the second panel segment 48 forming the second side 34 of the shade panel 30 (e.g., the portion of the panel 30 extending between the looped bottom portion 39 of the shade panel 30 and the second end 38 of the shade panel 30). As indicated above, when the shade panel 30 is moved to its fully extended position, it may be desirable to vertically align the alternating shade bands 40, 42 with one another between the first and second sides 32, 34 of the shade panel 30. For instance, when the first shade bands 40 are formed from a light-blocking material, it may be desirable to vertically align each first shade band 40 disposed on either side 32, 34 of the shade panel 30 with a corresponding second shade band 42 disposed on the opposed side 32, 34 of the shade panel 30 (e.g., as shown in FIG. 1). In such an embodiment, the first shade bands 30 may alternate vertically between the first and second sides 32, 34 of the shade panel 30 along the heightwise direction of the covering 10, thereby allowing the light-blocking potential of the shade panel 30 to be maximized.

However, in several embodiments, the shade panel 30 may only be considered to be at its fully extended position when the bottom rail assembly 70 bottoms out at the bottom of the architectural structure 12 relative to which the covering 10 is installed (e.g., when the bottom rail assembly 70 contacts the bottom of the architectural structure 12). For instance, as shown in FIG. 2, the shade panel 30 is at its fully extended position when the bottom rail assembly 70 contacts the bottom end 18 of the window frame 14 (e.g., such that the bottom rail assembly 70 rests on the window sill). As indicated above, when initially installing the covering 10 relative to the architectural structure 12, the shade bands 40, 42 may not be aligned as desired between the first and second sides 32, 34 of the panel 30 when the panel 30 is moved to the fully extended position. In such instance, as will be described below with reference to FIGS. 3-6, the vertical positioning of the idling roller 74 within the lower rail housing 72 may be adjusted, as desired, to ensure that the shade bands 40, 42 are properly aligned when the bottom rail assembly 70 bottoms out at the bottom of the architectural structure 12.

Figure 3:
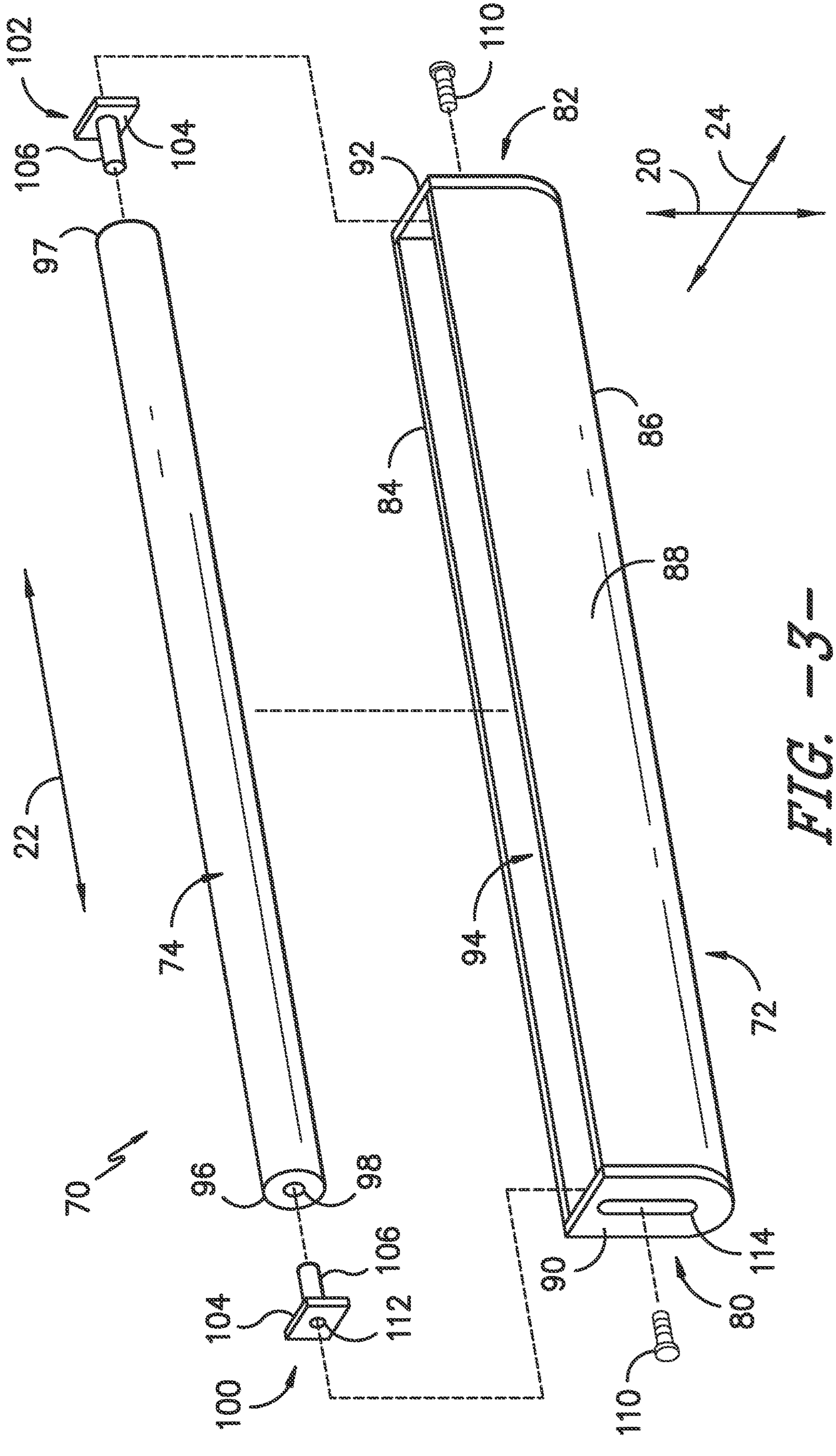
FIG. 3 illustrates an exploded, perspective view of a bottom rail assembly of the covering shown in FIG. 2 in accordance with aspects of the present subject matter.
Figure 4:
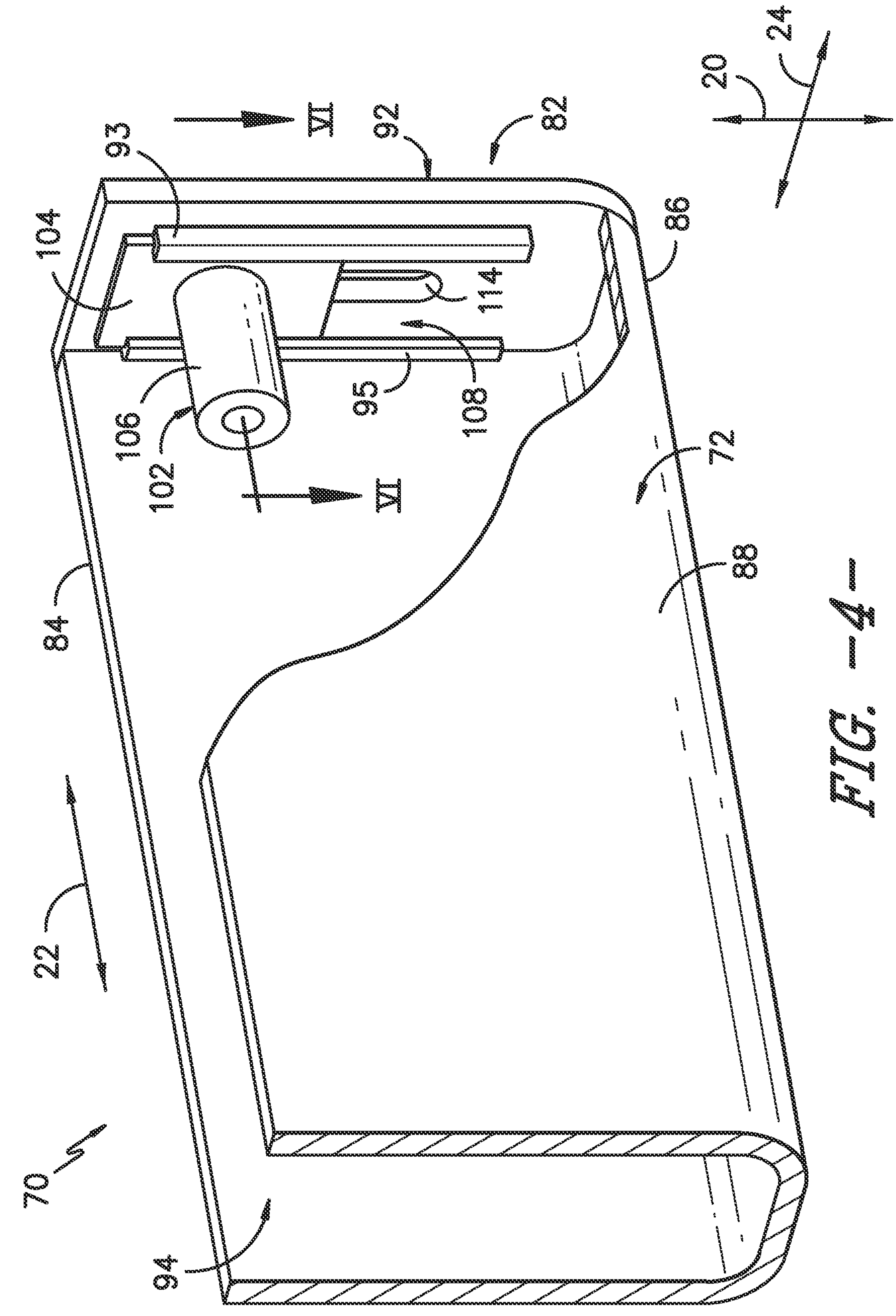
FIG. 4 illustrates an assembled, perspective view of a portion of the bottom rail assembly shown in FIG. 3, particularly illustrating a portion of a housing of the bottom rail assembly cut-away and a roller of the bottom rail assembly removed for purposes of illustration.
Figure 5:
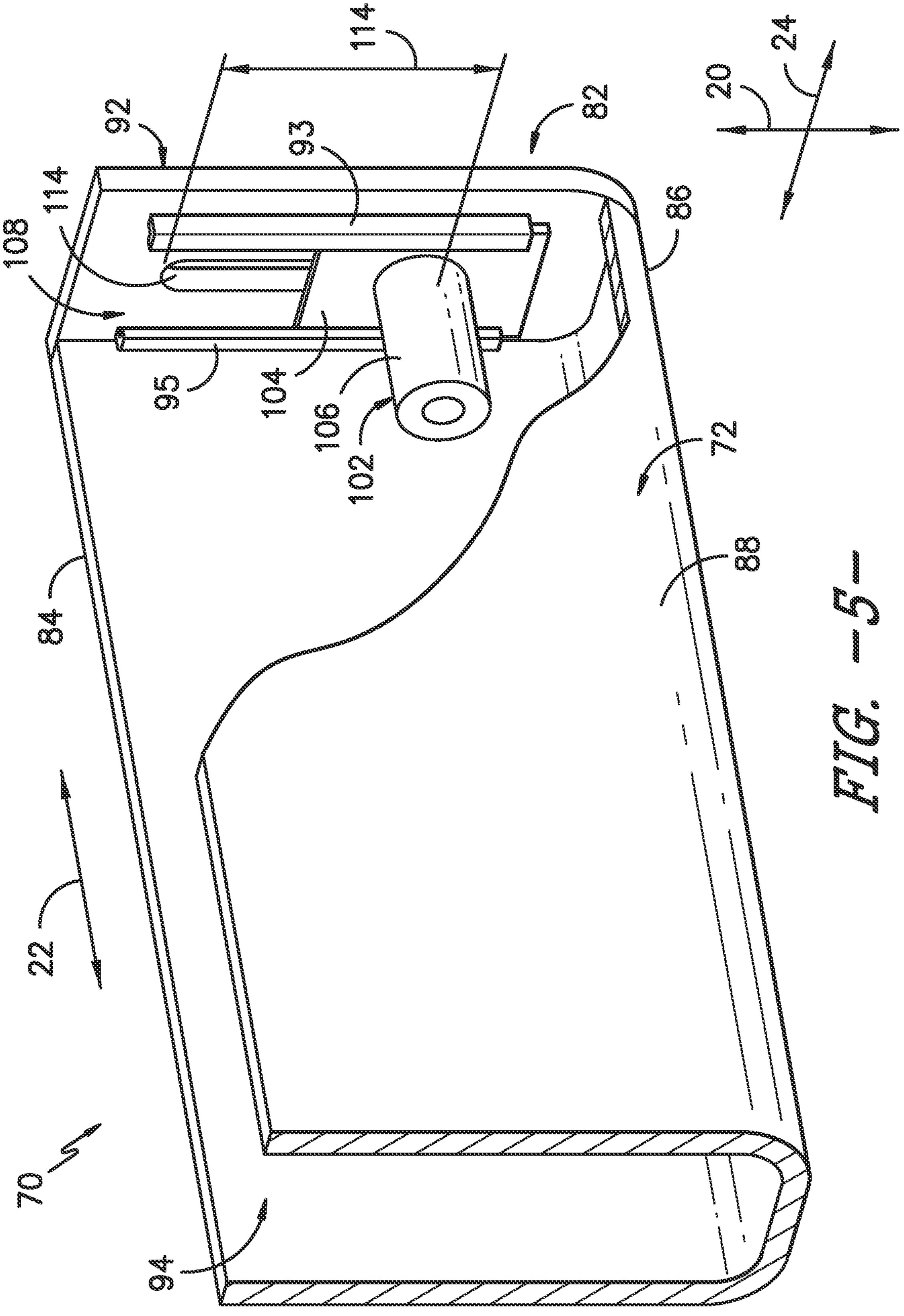
FIG. 5 illustrates a similar assembled, perspective view of the portion of the bottom rail assembly shown in FIG. 4, particularly illustrating a roller post member of the bottom rail assembly after it has been moved vertically relative to the housing of the bottom rail assembly.
Figure 6:
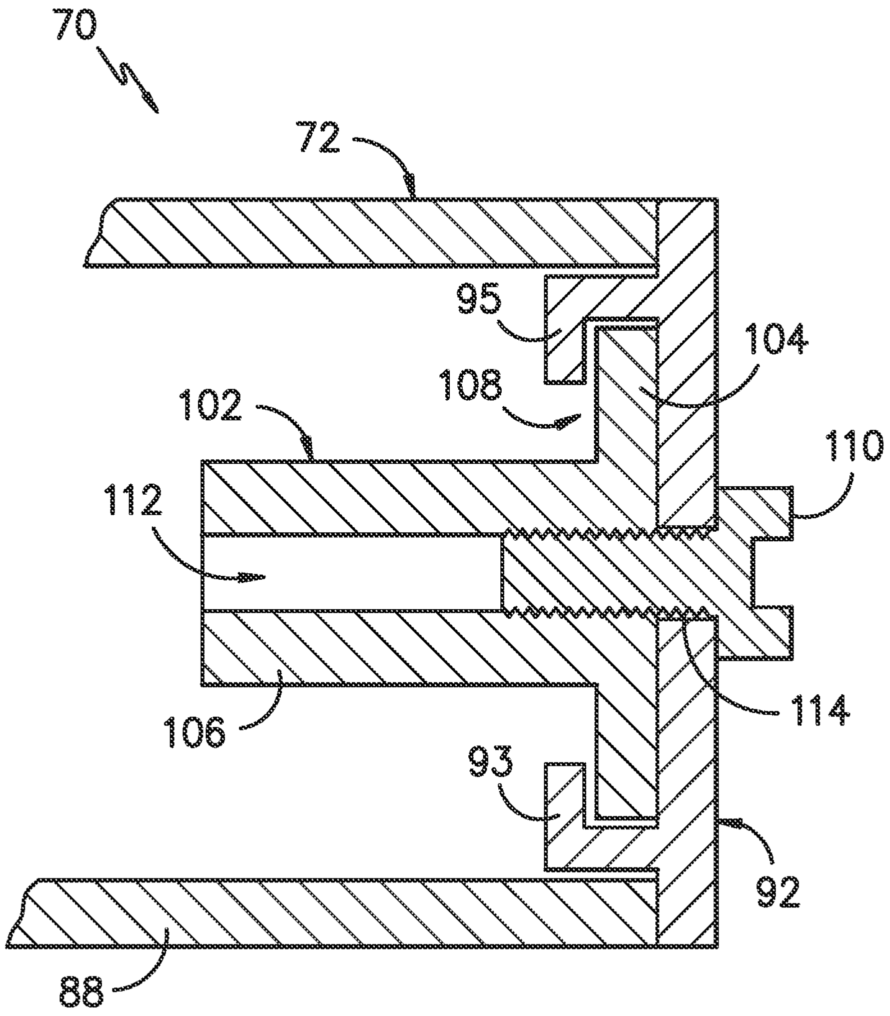
FIG. 6 illustrates a cross-sectional view of a portion of the bottom rail assembly shown in FIG. 4 taken about line VI-VI.

Referring now to FIGS. 3-6, several views of the bottom rail assembly 70 described above with reference to FIGS. 1 and 2 are illustrated in accordance with aspects of the present subject matter. Specifically, FIG. 3 illustrates a perspective, exploded view of the bottom rail assembly 70 and FIGS. 4 and 5 illustrate perspective, assembled views of an end portion of the bottom rail assembly 70 shown in FIG. 3, with a portion of the lower rail housing 72 being cut-away and the idling roller 74 being removed for purposes of illustration. Additionally, FIG. 6 illustrates a cross-sectional view of a portion of the bottom rail assembly 70 shown in FIG. 4 taken about line VI-VI.

As particularly shown in FIG. 3, the lower rail housing 72 of the bottom rail assembly 70 generally extends in the cross-wise direction 22 of the covering 10 between a first housing end 80 and a second housing end 82 and in the heightwise direction 20 of the covering 10 between a top end 84 and a bottom end 86. Additionally, as shown in FIG. 3, the lower rail housing 72 generally includes a rail portion 88 extending lengthwise between opposed first and second endcaps 90, 92 positioned at the first and second ends 80, 82 of the housing 72, respectively. As such, the rail portion 88, along with the opposed endcaps 90, 92, may generally define a cavity 94 for receiving both the idling roller 74 of the bottom rail assembly 70 and the portion of the shade panel 30 looped around the roller 74, with the cavity 94 being open along the top end 84 of the lower rail housing 72.

Additionally, as shown in FIG. 3, the bottom rail assembly 70 also includes first and second positioning mechanisms or roller post members 100, 102 configured to be provided in operative association with opposed ends 96, 97 of the idling roller 74 within the lower rail housing 72. Specifically, in several embodiments, the first roller post member 100 may be configured to rotationally support a first end 96 of the roller 74 relative to the housing 72 while the second roller post member 102 may be configured to rotationally support a second end 97 of the roller 74 relative to the housing 72. As shown in FIGS. 3-5, in one embodiment, each roller post member 100, 102 includes a base plate 104 and a roller post 106 extending from the base plate 104. In such an embodiment, the roller post 106 of each roller post member 102, 104 is configured to be received within an opening 98 defined through the opposed ends 96, 97 of the idling roller 74. Thus, when the roller post members 100, 102 and the idling roller 74 are installed within the lower rail housing 72, the roller 74 may be configured to rotate relative to the housing 72 about the roller posts 106, with the axis of rotation 76 (FIG. 2) of the roller 74 generally extending through the centers of the roller posts 106.

As shown in FIGS. 3-5, the first and second roller post members 100, 102 are configured to be installed within the lower rail housing 72 at or adjacent to the first and second endcaps 90, 92, respectively. Specifically, in several embodiments, a slot or guide channel 108 (FIGS. 4-6) may be defined at each endcap 90, 92 for receiving the base plate 104 of each roller post member 100, 102. For example, as shown in FIGS. 4-6, each endcap 90, 92 includes a pair of plate guides 93, 95, such as hooked flanges, extending outwardly therefrom, with the guides 93, 95 being spaced apart from one another such that the guide channel 108 is defined between the opposed guides 93, 95. In such an embodiment, the base plate 104 of each roller post member 100, 102 is slidably received within the guide channel 108 to allow the roller post member 100, 102 to be moved relative to the adjacent endcap 90, 92 between the top and bottom ends 84, 86 of the bottom rail assembly 70. Thus, by adjusting the position of the sliders or roller post members 100, 102 between the top and bottom ends 84, 86 of the bottom rail assembly 70, the relative position of the idling roller 74 within the lower rail housing 72 may be adjusted.

Moreover, in several embodiments, the bottom rail assembly 70 may include one or more holding mechanisms provided in operative association with each roller post member 100, 102. In general, the holding mechanism(s) may be configured to maintain each associated roller post member 100, 102 in position within the lower rail housing 72, thereby inhibiting or preventing further vertical movement of the roller post members 100, 102 relative to the housing 72. For instance, in one embodiment, each holding mechanism may correspond to a fastener configured to be coupled to a respective roller post member 100, 102, such as a threaded fastener 110 (e.g., a set screw) configured to be threaded or screwed into a corresponding threaded opening 112 (FIG. 6) defined in the base plate 104. As shown in FIGS. 4-6, the fastener 110 is, for example, configured to extend through an elongated slot 114 defined through the adjacent endcap 90, 92 of the bottom rail assembly 70, thereby allowing the fastener 110 to move with the associated roller post member 100, 102 as the position of such roller post member 100, 102 is adjusted relative to the lower rail housing 72. In such an embodiment, by tightening the fastener 110 against the adjacent end cap 90, 92, the associated roller post member 100, 102 is maintained or locked in place. Similarly, by loosening the fastener 110 relative to the adjacent end cap 90, 92, the associated roller post member 100, 102 is unlocked or otherwise decoupled from the endcap 90, 92, thereby allowing the vertical positioning of the roller post member 100, 102 to be adjusted within the lower rail housing 72.

By configuring each roller post member 100, 102 to be movable within its corresponding guide channel 108 between the top and bottom ends 84, 86 of the bottom rail assembly 70, the relative position of the idling roller 74 (and, thus, the relative position of the looped bottom portion 39 of the shade panel 30) within the lower rail housing 72 may be adjusted, as desired or necessary, to fine tune the alignment of the alternating shade bands 40, 42 of the shade panel 30. For instance, when the panel 30 is moved to the fully extended position (e.g., when the bottom end 86 of the bottom rail assembly 70 is located at or adjacent to the bottom of the adjacent architectural structure 12, such as that shown in FIG. 2 with the bottom rail assembly 70 being positioned adjacent to and/or contacting the bottom end 18 of the window frame 12) and the roller post members 100, 102 are unlocked relative to the lower rail housing 72, further rotation of the drive roller 64 in the lowering direction 28 (FIG. 2) may result in the idling roller 74 being moved relative to the lower rail housing 72 towards the bottom end 86 of the bottom rail assembly 70. In such instance, the associated roller post members 100, 102 may slide or move downwardly within their respective guide channels 108 (e.g., from the position shown in FIG. 4 to the position shown in FIG. 5) as both the idling roller 74 and the bottom looped portion 39 of the shade panel 30 are lowered relative to the lower rail housing 72. Similarly, to adjust the position of the roller 74 in the direction of the top end 84 of the bottom rail assembly 70, the drive roller 64 may be rotated in the opposite, raising direction 26 (FIG. 2). In such instance, the associated roller post members 100, 102 may slide or move upwardly within their respective guide channels 108 (e.g., from the position shown in FIG. 5 to the position shown in FIG. 4) as both the idling roller 74 and the bottom looped portion 39 of the shade panel 30 are raised relative to the lower rail housing 72. Once the shade bands 40, 42 of the shade panel 30 are aligned as desired, the roller post members 100, 102 is held or locked in place relative to the lower rail housing 72 (e.g., via the holding mechanisms, such as the fasteners 110), thereby setting the alignment of the shade bands 40, 42 at the fully extended position of the covering 10. As such, when the shade panel 30 is subsequently retracted and then returned back to the fully extended position, the shade bands 40, 42 may be vertically aligned as previously set.

It should be appreciated that a length 50 (FIG. 2) of the first and second shade segments 46, 48 of the shade panel 30 defined between the head rail assembly 60 and the looped bottom portion 39 of the shade panel 30 may be varied when adjusting the position of the idling roller 74 and the bottom looped portion 39 within the lower rail housing 72. For instance, the length 50 may be increased when the idling roller 74 and the bottom looped portion 39 of the shade panel 30 are lowered relative to the lower rail housing 72 towards its bottom end 86. Similarly, the length 50 may be decreased when the idling roller 74 and the bottom looped portion 39 of the shade panel 30 are raised relative to the lower rail housing 72 towards its top end 84.

It should also be appreciated that each roller post members 100, 102 may be configured to move or slide within its associated guide channel 108 relative to the lower rail housing 72 across a given vertical travel range 116 (FIG. 5). For instance, in one embodiment, the lower rail housing 72 and/or the roller post members 100, 102 may be configured such that the vertical travel range 116 is equal to at least 50% of the maximum height 44 defined by the shade bands 40, 42 of the shade panel 30. In such an embodiment, since the maximum vertical offset distance that can be defined between the shade bands 40, 42 corresponds to one-half of the maximum height 44 of the shade bands 40, 42, the position of the roller post members 100, 102 may be adjusted within the lower rail housing 72 to accommodate any vertical offset defined between the shade bands 40, 42 when the shade panel 30 is moved to the fully extended position.

Additionally, it should be appreciated that, in the illustrated embodiment, the vertical travel range 116 of the roller post members 100, 102 is generally defined by the length of the slot 114 defined in each endcap 90, 92. However, in other embodiments, the vertical travel range 116 may be set using any other suitable means, such as by including mechanical stops extending from the adjacent endcap 90, 92 at the top and bottom ends of the desired vertical travel range 116 to limit the vertical movement of each roller post member 100, 102 relative to the lower rail housing 72.

Figure 7:
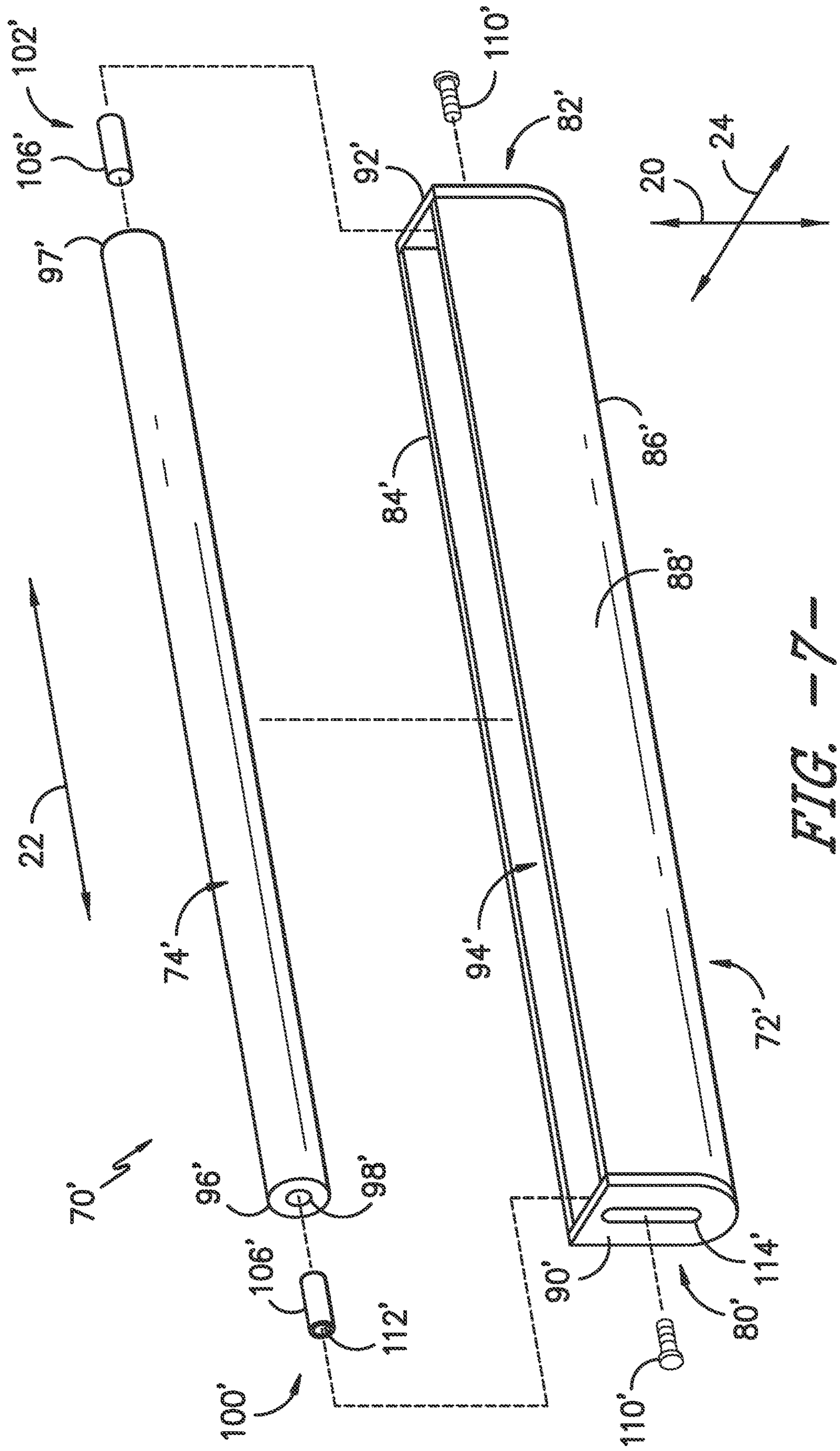
FIG. 7 illustrates an exploded, perspective view of another embodiment of a bottom rail assembly suitable for use within a covering in accordance with aspects of the present subject matter.
Figure 8:
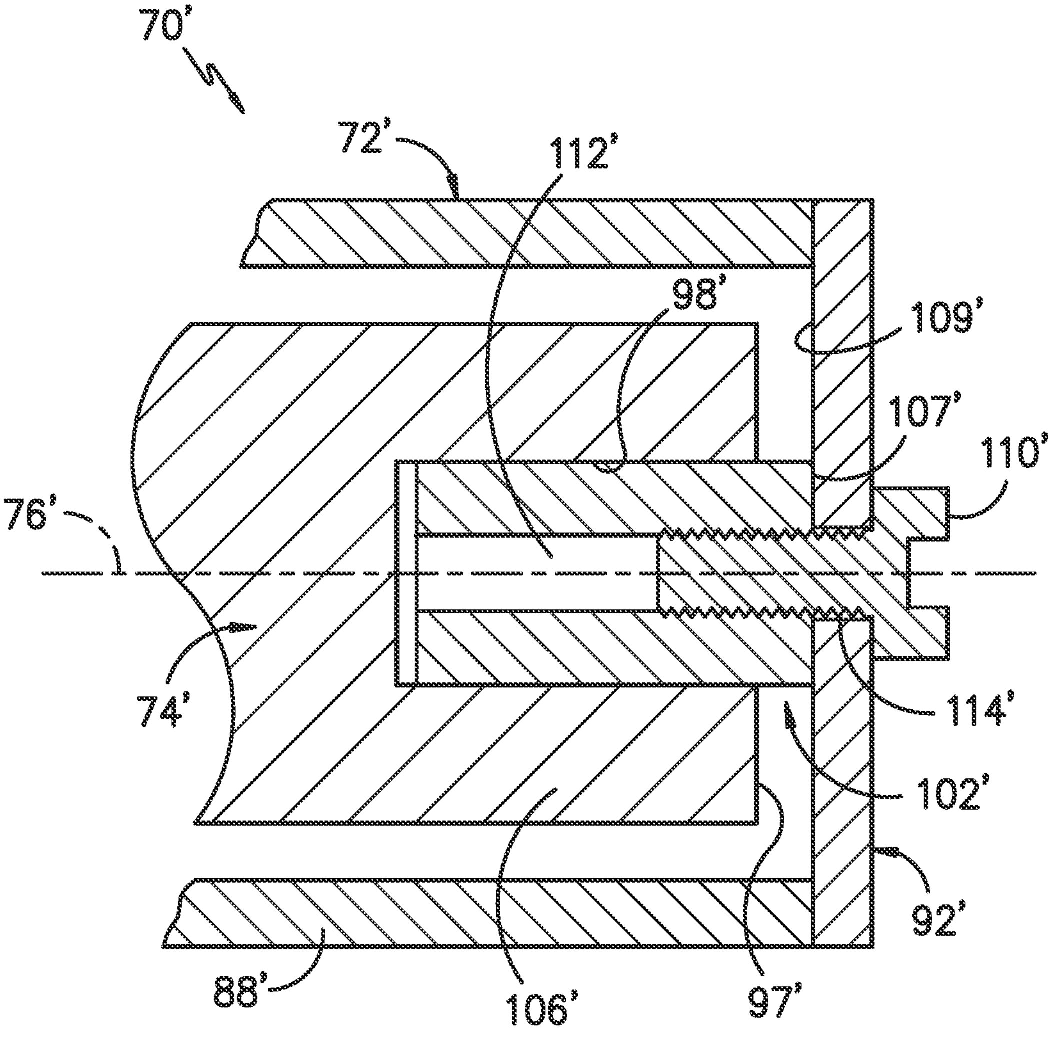
FIG. 8 illustrates a cross-sectional view of an assembled end portion of the bottom rail assembly shown in FIG. 7 in accordance with aspects of the present subject matter.

Referring now to FIGS. 7 and 8, differing views of another embodiment of a bottom rail assembly 70' suitable for use with a covering, such as the covering 10 shown in FIGS. 1 and 2, are illustrated in accordance with aspects of the present subject matter. Specifically, FIG. 7 illustrates an exploded, perspective view of the bottom rail assembly 70' and FIG. 8 illustrates a cross-sectional view of an assembled end portion of the bottom rail assembly 70' shown in FIG. 7 in accordance with aspects of the present subject matter. In general, the bottom rail assembly 70' shown in FIGS. 7 and 8 and its associated components and/or features are configured similar to the bottom rail assembly 70 described above with reference to FIGS. 1-6. As such, the components and/or features of the bottom rail assembly 70' that are the same or similar to corresponding components and/or features of the bottom rail assembly 70 described above with reference to FIGS. 1-6 will be designated by the same reference character with an apostrophe (') added. Additionally, when a given component and/or feature of the bottom rail assembly 70' is configured to generally perform the same function as the corresponding component and/or feature of the bottom rail assembly 70 described above with reference to FIGS. 1-6, a less detailed description of such component/feature will be provided with reference to FIGS. 7 and 8 for the sake of brevity.

As shown, similar to the embodiment of the bottom rail assembly 70 described above, the bottom rail assembly 70' includes a lower rail housing 72' and an idling roller 74' extending lengthwise within the rail housing 72', with the idling roller 74' being generally rotationally supported within the lower rail housing 72' for rotation relative to the rail housing 72' about an idling axis of rotation 76' (FIG. 8). The lower rail housing 72' may generally extend in the cross-wise direction 22 (FIG. 7) of the associated covering between a first housing end 80' and a second housing end 82' and in the heightwise direction 20 (FIG. 7) of the associated covering between a top end 84' and a bottom end 86'. Additionally, as shown in FIG. 7, the lower rail housing 72' generally includes a rail portion 88 extending lengthwise between opposed first and second endcaps 90', 92' positioned at the first and second ends 80', 82' of the housing 72', respectively, so as to define a cavity 94' for receiving both the idling roller 74' of the bottom rail assembly 70' and the portion of the shade panel 30 (FIGS. 1 and 2) configured to be looped around the roller 74'. Moreover, as shown in FIGS. 7 and 8, an elongated slot 114' is defined through each endcap 90', 92' of the lower rail housing 72'.

Additionally, as shown in the illustrated embodiment, the bottom rail assembly 70' also includes first and second positioning mechanisms or roller post members 100', 102' provided in operative association with opposed ends 96', 97' of the idling roller 74' within the lower rail housing 72'. Specifically, in several embodiments, the first roller post member 100' may be configured to rotationally support a first end 96' of the roller 74' relative to the housing 72' while the second roller post member 102' may be configured to rotationally support a second end 97' of the roller 74' relative to the housing 72'. However, unlike the embodiment of the roller post members 100, 102 described above with reference to FIGS. 3-6, each roller post member 100', 102' simply includes a roller post 106' configured to be coupled to an associated holding mechanism to rotationally support the opposed ends 9'6, 97' of the idling roller 74' within the lower rail housing 72'. Specifically, as shown in FIGS. 7 and 8, the roller post 106' of each roller post member 100', 102' is configured to be received within an opening 98' defined through the opposed ends 96', 97' of the idling roller 74'. Thus, when the roller posts 106' and the idling roller 74' are installed within the lower rail housing 72', the roller 74' may be configured to rotate relative to the housing 72' about the roller posts 106', with the axis of rotation 76' (FIG. 8) for the roller 74' generally extending through the centers of the roller posts 106'.

Moreover, the holding mechanism provided in operative association with each roller post 106' may be configured to maintain each associated roller post member 100', 102' in position relative to the lower rail housing 72', thereby inhibiting or preventing further vertical movement of the roller 74' within the housing 72'. For instance, each holding mechanism may, in one embodiment, correspond to a threaded fastener 110' (e.g., a set screw) configured to extend through the elongated slot 114' defined through the adjacent endcap 90', 92' of the housing 72' to allow the fastener 110' to be threaded or screwed into a corresponding threaded opening 112' defined in each roller post 106', thereby allowing the fastener 110' to move with the associated roller post 106' as the position of the roller 74' is being adjusted relative to the lower rail housing 72'. In such an embodiment, by tightening the fastener 110' against the adjacent end cap 90', 92', the relative vertical positioning of the adjacent end 96', 97' of the roller 74' within the lower rail housing 72' may be maintained or locked in place. Similarly, by loosening the fastener 110' relative to the adjacent end cap 90', 92', the adjacent end 96', 97' of the roller 74' may be unlocked or otherwise decoupled from the end cap 90', 92', thereby allowing the vertical positioning of the roller 74' to be adjusted within the lower rail housing 72'.

It should be appreciated that, in one embodiment, each roller post 106' and/or each endcap 90', 92' may include gripping or friction features at the interface between such components to assist in maintaining the position of the adjacent end 96', 97' of the roller 74' in place when it is intended that the roller post members 100', 102' be held or locked in place relative to the lower rail housing 72'. For instance, as shown in FIG. 8, when the associated holding mechanisms (e.g., fasteners 110') are tightened against the end caps 90', 92' to hold or lock each roller post member 100', 102' in place, an end surface 107' of each roller post 106' may be engaged against a corresponding inner surface 109' of the adjacent endcap 90', 92'. In such an embodiment, one or both of the adjacent surfaces 107', 109' may include or define gripping or friction elements (e.g., small ridges) or may be coated with a given friction coating or similar coating to increase the friction between the roller post 106' and the adjacent endcap 90', 92'.

Similar to the embodiment described above, the illustrated roller post members 100', 102' allow the relative position of the idling roller 74' (and, thus, the relative position of the looped bottom portion 39 of the shade panel 30 (FIG. 2)) within the lower rail housing 72' to be adjusted, as desired or necessary, to fine tune the alignment of the alternating shade bands 40, 42 of the shade panel 30 (FIG. 1). For instance, when the panel 30 is moved to the fully extended position (e.g., when the bottom end 86' of the bottom rail assembly 70' is located at or adjacent to the bottom of the adjacent architectural structure 12, such as that shown in FIG. 2 with the bottom rail assembly 70 being positioned adjacent to and/or contacting the bottom end 18 of the window frame 12) and the roller post members 100', 102' are unlocked relative to the lower rail housing 72', further rotation of the drive roller 64 in the lowering direction 28 (FIG. 2) may result in the idling roller 74' being moved relative to the lower rail housing 72' towards the bottom end 86' of the bottom rail assembly 70'. Similarly, to adjust the position of the roller 74' in the direction of the top end 84' of the bottom rail assembly 70', the drive roller 64' may be rotated in the opposite, raising direction 26 (FIG. 2). Once the shade bands 40, 42 of the shade panel 30 are aligned as desired, the roller post members 100', 102' may be held or locked in place relative to the lower rail housing 72' (e.g., via the associated holding mechanisms, such as the fasteners 110'), thereby setting the alignment of the shade bands 40, 42 at the fully extended position of the covering 10. As such, when the shade panel 30 is subsequently retracted and then returned back to the fully extended position, the shade bands 40, 42 may be vertically aligned as previously set.

Figure 9:
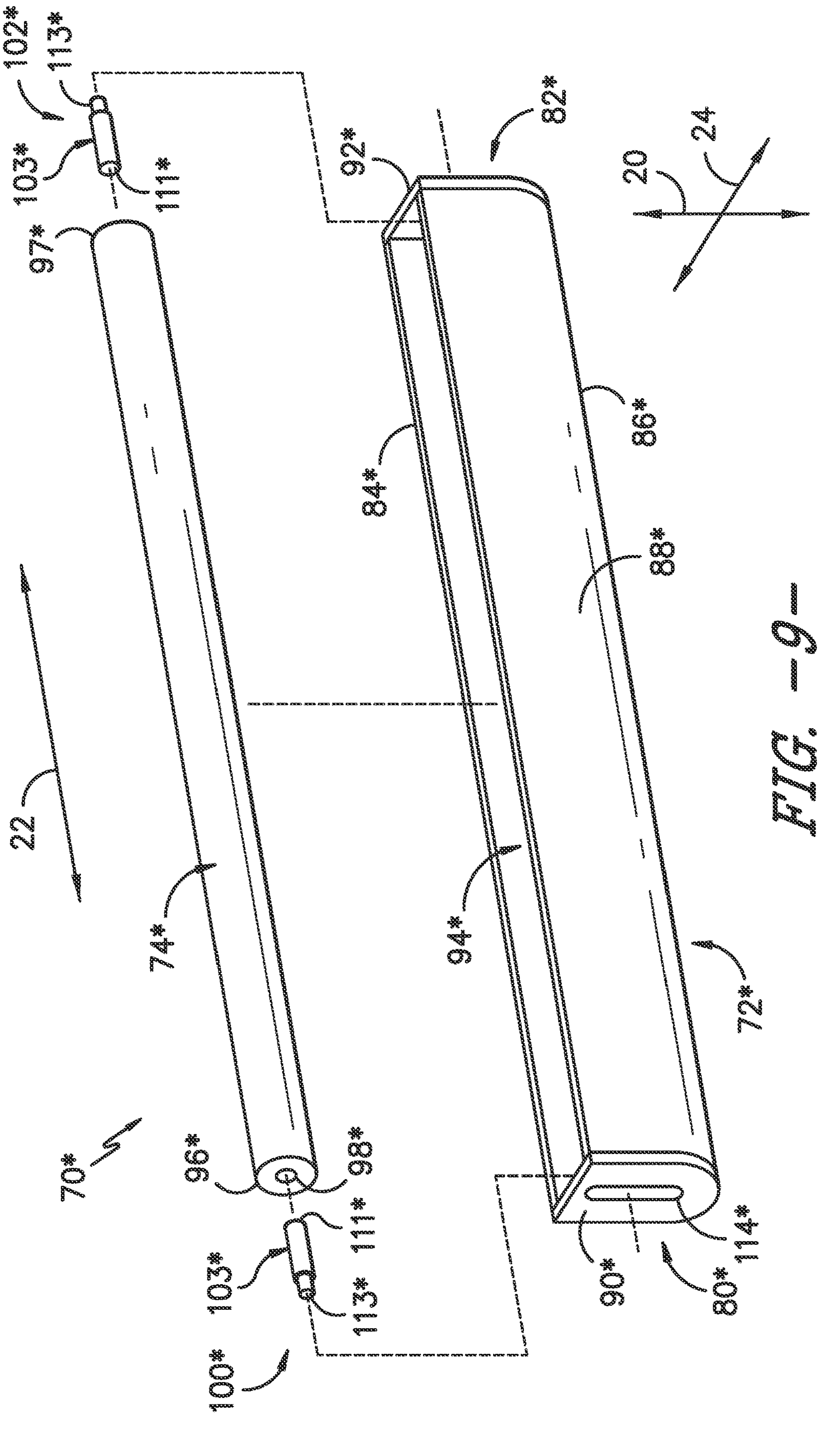
FIG. 9 illustrates an exploded, perspective view of a further embodiment of a bottom rail assembly suitable for use within a covering in accordance with aspects of the present subject matter.
Figure 10:
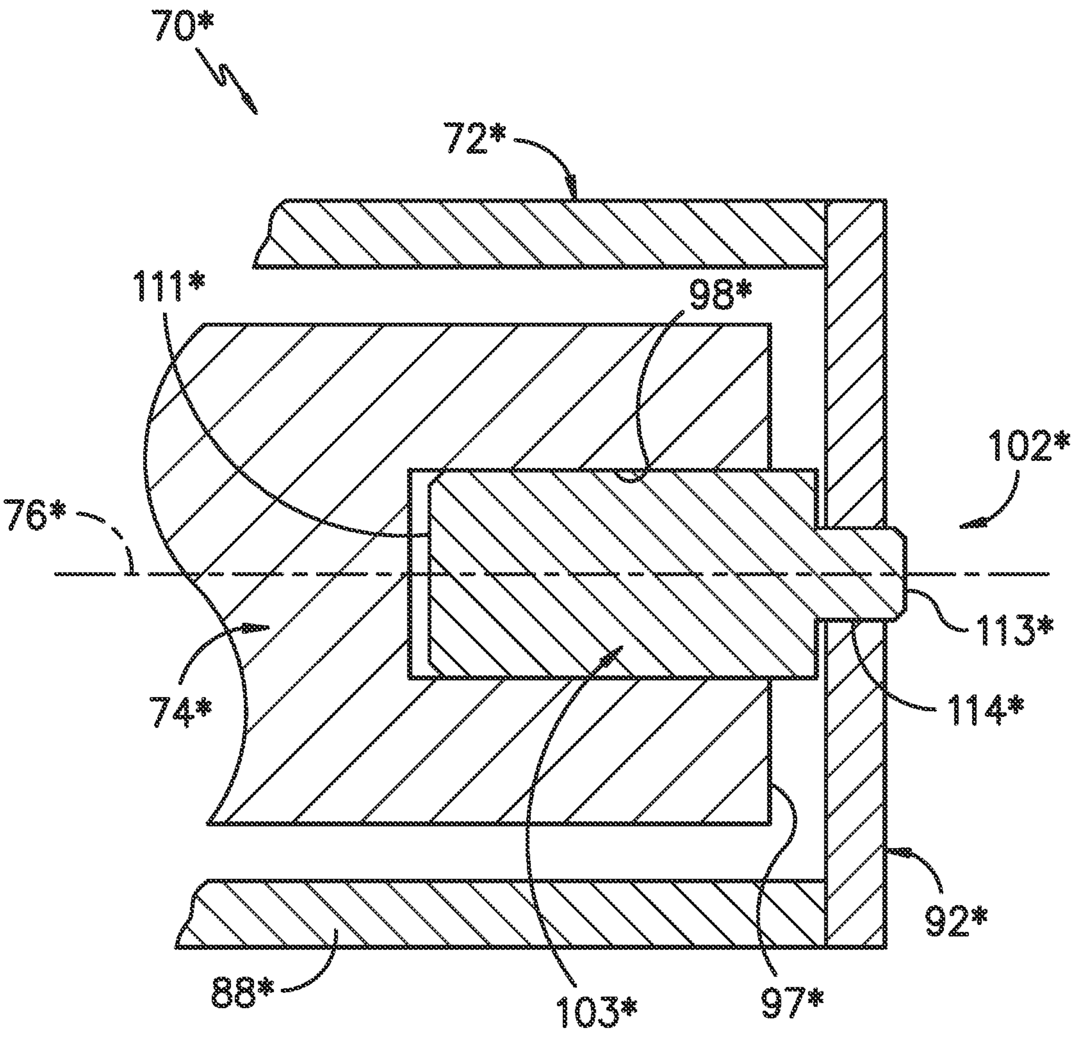
FIG. 10 illustrates a cross-sectional view of an assembled end portion of the bottom rail assembly shown in FIG. 9 in accordance with aspects of the present subject matter.

Referring now to FIGS. 9 and 10, differing views of a further embodiment of a bottom rail assembly 70* suitable for use with a covering, such as the covering 10 shown in FIGS. 1 and 2, are illustrated in accordance with aspects of the present subject matter. Specifically, FIG. 9 illustrates an exploded, perspective view of the bottom rail assembly 70* and FIG. 10 illustrates a cross-sectional view of an assembled end portion of the bottom rail assembly 70* shown in FIG. 9 in accordance with aspects of the present subject matter. In general, the bottom rail assembly 70* shown in FIGS. 9 and 10 and its associated components and/or features are configured similar to the bottom rail assembly 70 described above with reference to FIGS. 1-6. As such, the components and/or features of the bottom rail assembly 70* that are the same or similar to corresponding components and/or features of the bottom rail assembly 70 described above with reference to FIGS. 1-6 will be designated by the same reference character with an asterisk (*) added. Additionally, when a given component and/or feature of the bottom rail assembly 70* is configured to generally perform the same function as the corresponding component and/or feature of the bottom rail assembly 70 described above with reference to FIGS. 1-6, a less detailed description of such component/feature will be provided with reference to FIGS. 9 and 10 for the sake of brevity.

As shown in FIGS. 9 and 10, similar to the embodiment of the bottom rail assembly 70 described above with reference to FIGS. 1-6, the bottom rail assembly 70* includes a lower rail housing 72* and an idling roller 74* extending lengthwise within the rail housing 72*, with the idling roller 74* being generally rotationally supported within the lower rail housing 72* for rotation relative to the rail housing 72* about an idling axis of rotation 76* (FIG. 10). The lower rail housing 72* may generally extend in the cross-wise direction 22 (FIG. 9) of the associated covering between a first housing end 80* and a second housing end 82* and in the heightwise direction 20 (FIG. 10) of the associated covering between a top end 84* and a bottom end 86*. Additionally, as shown in FIG. 9, the lower rail housing 72* generally includes a rail portion 88* extending lengthwise between opposed first and second endcaps 90*, 92* positioned at the first and second ends 80*, 82* of the housing 72*, respectively, so as to define a cavity 94* for receiving both the idling roller 74* of the bottom rail assembly 70* and the portion of the shade panel 30 (FIG. 2) configured to be looped around the roller 74. Moreover, as shown in FIGS. 9 and 10, an elongated slot 114* is defined through each endcap 90*, 92* of the lower rail housing 72*.

Additionally, as shown in the illustrated embodiment, the bottom rail assembly 70* also includes first and second positioning mechanisms or roller post members 100*, 102* provided in operative association with opposed ends 96*, 97* of the idling roller 74* relative to the lower rail housing 72*. Specifically, in several embodiments, the first roller post member 100* may be associated with a first end 96* of the roller 74* while the second roller post member 102* may be associated with a second end 97* of the roller 74*. However, unlike the embodiment of the roller post members 100, 102 described above with reference to FIGS. 3-6, each roller post member 100*, 102* simply includes a guide post 103* configured to extend through the elongated slot 114* defined through the adjacent endcap 90*, 92* of the lower rail housing 72* to support the opposed ends 96*, 97* of the idling roller 74* within the lower rail housing 72*. Specifically, as shown in FIGS. 9 and 10, each guide post 103* corresponds to a separate component extending lengthwise between a first end 111* configured to be received within a corresponding opening 98* defined through the adjacent end 96*, 97* of the idling roller 74* and a second end 113* configured to be received within (and/or extend through) the adjacent endcap slot 114*. However, in other embodiments, each guide post 103* may be formed integrally with the roller 74* such that each post 103* corresponds to a projection or extension of the roller 74* of a smaller diameter that extends through the adjacent endcap slot 114*. Regardless, the portion of each guide post 103* received within the adjacent endcap slot 114* may serve to guide the roller 74* in the heightwise direction 20 as its relative position within the housing 72* is being adjusted.

Similar to the embodiments described above, the illustrated roller post members 100*, 102* assist in facilitating the adjustment of the relative position of the idling roller 74* (and, thus, the relative position of the looped bottom portion 39 of the shade panel 30 (FIG. 2)) within the lower rail housing 72, when desired or necessary, to fine tune the alignment of the alternating shade bands 40, 42 of the shade panel 30 (FIG. 1). For example, when the panel 30 is moved to the fully extended position (e.g., when the bottom end 86* of the bottom rail assembly 70* is located at or adjacent to the bottom of the adjacent architectural structure 12, such as that shown in FIG. 2 with the bottom rail assembly 70 being positioned adjacent to and/or contacting the bottom end 18 of the window frame 12), further rotation of the drive roller 64 in the lowering direction 28 (FIG. 2) may result in the idling roller 74* being moved relative to the lower rail housing 72* towards the bottom end 86* of the bottom rail assembly 70*. Similarly, to adjust the position of the roller 74* in the direction of the top end 84* of the bottom rail assembly 70*, the drive roller 64 may be rotated in the opposite, raising direction 26 (FIG. 2). However, unlike the embodiments described above that include holding mechanisms to hold or lock the opposed ends 96*, 97* of the roller 74* in place relative to the lower rail housing 72*, the configuration of the bottom rail assembly 70* shown in FIGS. 9 and 10 allows for the vertical positioning of the roller 74* within the housing 72* to be freely adjusted without manipulation of an associated holding mechanism (s). In such an embodiment, when the shade panel 30 is subsequently retracted and then returned back to the fully extended position, the relative position of the idling roller 74* within the lower rail housing 72* may again be adjusted, as desired or necessary, to fine tune the alignment of the alternating shade bands 40, 42 of the shade panel 30.

Figure 11:
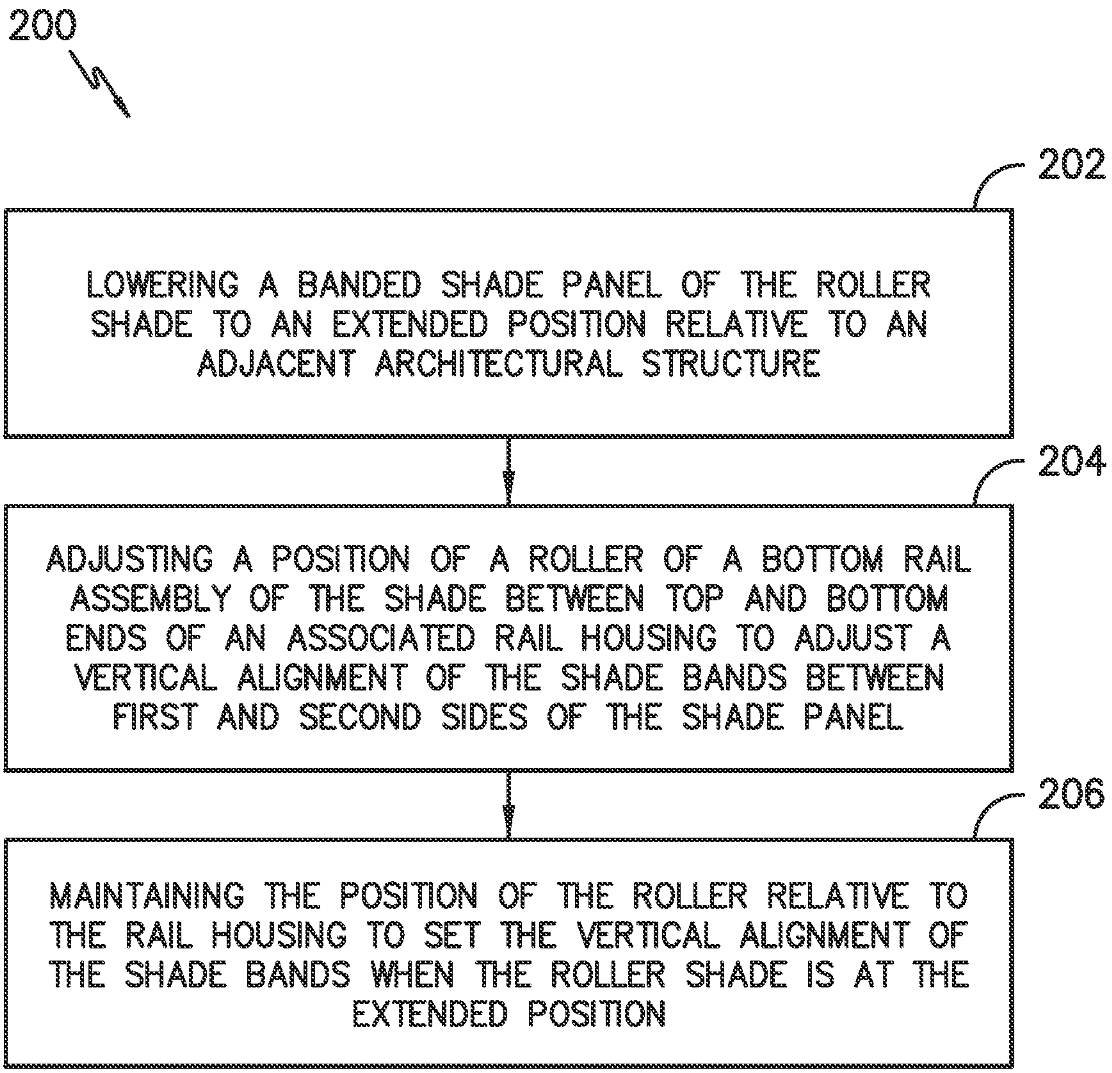
FIG. 11 illustrates a flow diagram of one embodiment of a method for adjusting the alignment of shade bands of an associated banded roller shade in accordance with aspects of the present subject matter.

Referring now to FIG. 11, a flow diagram of one embodiment of a method 200 for adjusting the alignment of shade bands of an associated banded roller shade is illustrated in accordance with aspects of the present subject matter. In general, the method 200 will be described herein with reference to the covering 10 and bottom rail assembly 70 shown in FIGS. 1-6. However, it should be appreciated that the disclosed method 200 may be implemented with coverings having any other suitable configuration and/or with bottom rail assemblies having any other suitable configuration consistent with the disclosure provided herein, such as with the bottom rail assembles 70', 70* described above with reference to FIGS. 7-10. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 11, at (202), the method 200 includes lowering a banded shade panel of an associated roller shade to an extended position relative to an adjacent architectural structure. For instance, as indicated above, the shade panel 30 may be lowered to a fully extended position at which the roller shade is located at or adjacent to the bottom of the adjacent architectural structure 12, such as when the bottom of the roller shade contacts the bottom end 18 of an adjacent window frame 14.

Additionally, at (204), the method 200 includes adjusting a position of a roller of a bottom rail assembly of the shade between top and bottom ends of an associated rail housing to adjust a vertical alignment of the shade bands between first and second sides of the shade panel. Specifically, as indicated above with reference to FIGS. 3-6, when the roller post members 100, 102 are unlocked relative to the lower rail housing 72, the shade panel 30 may be lowered or raised (e.g., via rotation of the drive roller 64) to allow the positions of both the idling roller 74 and the roller post members 100, 102 to be adjusted within the rail housing 72, thereby adjusting the vertical alignment of the shade bands 40, 42.

Moreover, at (206), the method 200 includes maintaining the position of the roller relative to the rail housing to set the vertical alignment of the shade bands when the roller shade is at the extended position. For example, as indicated above FIGS. 3-6, each roller post member 100, 102 includes a holding mechanism (e.g., a threaded fastener 110) associated therewith. Thus, by using the holding mechanism to maintain the position of each roller post member 100, 102 relative to the rail housing 72, the vertical alignment of the shade bands 40, 42 may be set for the extended position of the roller shade. As such, when the shade panel 30 is subsequently retracted and then returned back to such extended position, the shade bands 40, 42 may be vertically aligned as previously set. However, in embodiments in which a bottom rail assembly does not include holding mechanisms (e.g., bottom rail assembly 70* described above with reference to FIGS. 9 and 10), the roller may be maintained in position relative to the rail housing by simply ceasing or stopping further movement of the roller within the housing.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. A covering for an architectural structure, said covering comprising:
- a shade panel movable between an extended position and a retracted position, said shade panel including first and second shade bands provided in an alternating configuration along a length of said shade panel;
- a bottom rail housing coupled to said shade panel, said bottom rail housing extending between a bottom end and a top end;
- a roller positioned within said bottom rail housing; and
- a roller post member non-rotatably coupled to said bottom rail housing and configured to support said roller relative to said bottom rail housing;

wherein:
- said shade panel includes a looped bottom portion extending around said roller such that said shade panel includes both a first shade segment extending upwardly from said bottom rail housing that forms a first side of said shade panel and a second shade segment extending upwardly from said bottom rail housing that forms a second side of said shade panel;
- said roller is configured to rotate relative to said roller post member; and
- said roller and said roller post member are movable together relative to said bottom rail housing to adjust a vertical alignment of said first and second shade bands between said first and second sides of said shade panel.

2. The covering of claim 1, wherein said first and second shade bands are formed from different materials.

3. The covering of claim 1, wherein said first shade bands allow less light to pass therethrough than said second shade bands.

4. The covering of claim 1, wherein:
- said roller post member includes a roller post; and
- said roller is rotationally supported on said roller post for rotation relative to said roller post member about an axis of rotation.

5. The covering of claim 4, wherein said roller and said roller post member are configured to be moved together relative to said bottom rail housing to adjust a vertical position of the axis of rotation between said top and bottom ends of said bottom rail housing.

6. The covering of claim 4, wherein:

said roller post member further includes a base plate;

said roller post extends outwardly from said base plate; and said base plate is received within a guide channel defined within said bottom rail housing.

7. The covering of claim 6, wherein said guide channel is defined by opposed guides extending from an endcap of said bottom rail housing within an interior of said bottom rail housing.

8. The covering of claim 7, wherein said base plate is configured to slide between said opposed guides and said endcap as said roller and said roller post member are being moved together relative to said bottom rail housing.

9. The covering of claim 1, wherein:

said bottom rail housing extends lengthwise between a first housing end and a second housing end;

said roller post member comprises a first roller post member configured to support a first end of said roller at a location adjacent to said first housing end for rotation relative to said first roller post member about an axis of rotation; and a second roller post member is configured to support a second end of said roller at a location adjacent to said second housing end for rotation relative to said second roller post member about the axis of rotation.

10. A covering for an architectural structure, said covering comprising:

a shade panel movable between an extended position and a retracted position; and a bottom rail assembly coupled to said shade panel, said bottom rail assembly including a rail housing extending between a bottom end and a top end, said bottom rail assembly further including a roller extending within said rail housing and a roller post member configured to support said roller relative to said rail housing;

wherein:

said shade panel is looped around said roller such that said shade panel includes both a first shade segment extending upwardly from said roller that forms a first side of said shade panel and a second shade segment extending upwardly from said roller that forms a second side of said shade panel;

said roller post member supports said roller for rotation relative to said roller post member about an axis of rotation, and said roller post member is non-rotatably coupled to said rail housing; and said roller and said roller post member are movable together relative to said rail housing to adjust a vertical position of the axis of rotation between said top and bottom ends of said rail housing.

11. The covering of claim 10, wherein:

said roller post member includes a roller post; and said roller is rotationally supported on said roller post for rotation relative to said roller post member about the axis of rotation.

12. The covering of claim 11, wherein:

said roller post member further includes a base plate;

said roller post extends outwardly from said base plate; and said base plate is received within a guide channel defined within said rail housing.

13. The covering of claim 12, wherein said guide channel is defined by opposed guides extending from an endcap of said rail housing within an interior of said rail housing.

14. The covering of claim 13, wherein said base plate is configured to slide between said opposed guides and said endcap as said roller and said roller post member are being moved together relative to said rail housing.

15. The covering of claim 1, wherein:

said rail housing extends lengthwise between a first housing end and a second housing end;

said roller post member comprises a first roller post member configured to support a first end of said roller at a location adjacent to said first housing end for rotation relative to said first roller post member about the axis of rotation; and a second roller post member is configured to support a second end of said roller at a location adjacent to said second housing end for rotation relative to said second roller post member about the axis of rotation.

16. The covering of claim 10, wherein:

said shade panel includes first and second shade bands provided in an alternating configuration along a length of said shade panel; and said roller and said roller post member are movable together relative to said rail housing to adjust a vertical alignment of said first and second shade bands between said first and second sides of said shade panel.

17. A covering for an architectural structure, said covering comprising:

a shade panel movable between an extended position and a retracted position; and a bottom rail assembly coupled to said shade panel, said bottom rail assembly including a rail housing extending between a bottom end and a top end, said bottom rail assembly further including a roller extending within said rail housing and a roller post member coupled to said rail housing, said roller post member comprising a base plate and a roller post extending outwardly from said base plate;

wherein:

said shade panel is looped around said roller such that said shade panel includes both a first shade segment extending upwardly from said roller that forms a first side of said shade panel and a second shade segment extending upwardly from said roller that forms a second side of said shade panel;

said roller post supports said roller for rotation relative to said roller post member;

said base plate is received within a guide channel defined within an interior of said rail housing such that said roller post member is non-rotatably coupled to said rail housing; and said base plate is configured to slide within said guide channel with movement of said roller and said roller post member relative to said rail housing.

18. The covering of claim 17, wherein:

said guide channel is defined by opposed guides extending from an endcap of said rail housing within the interior of said rail housing; and said base plate is configured to slide between said opposed guides and said endcap as said roller and said roller post member are being moved together relative to said rail housing.

* * * * *